July 15, 1947.  F. C. LATHROPE  2,423,986
NESTING PIPE
Filed Feb. 6, 1946
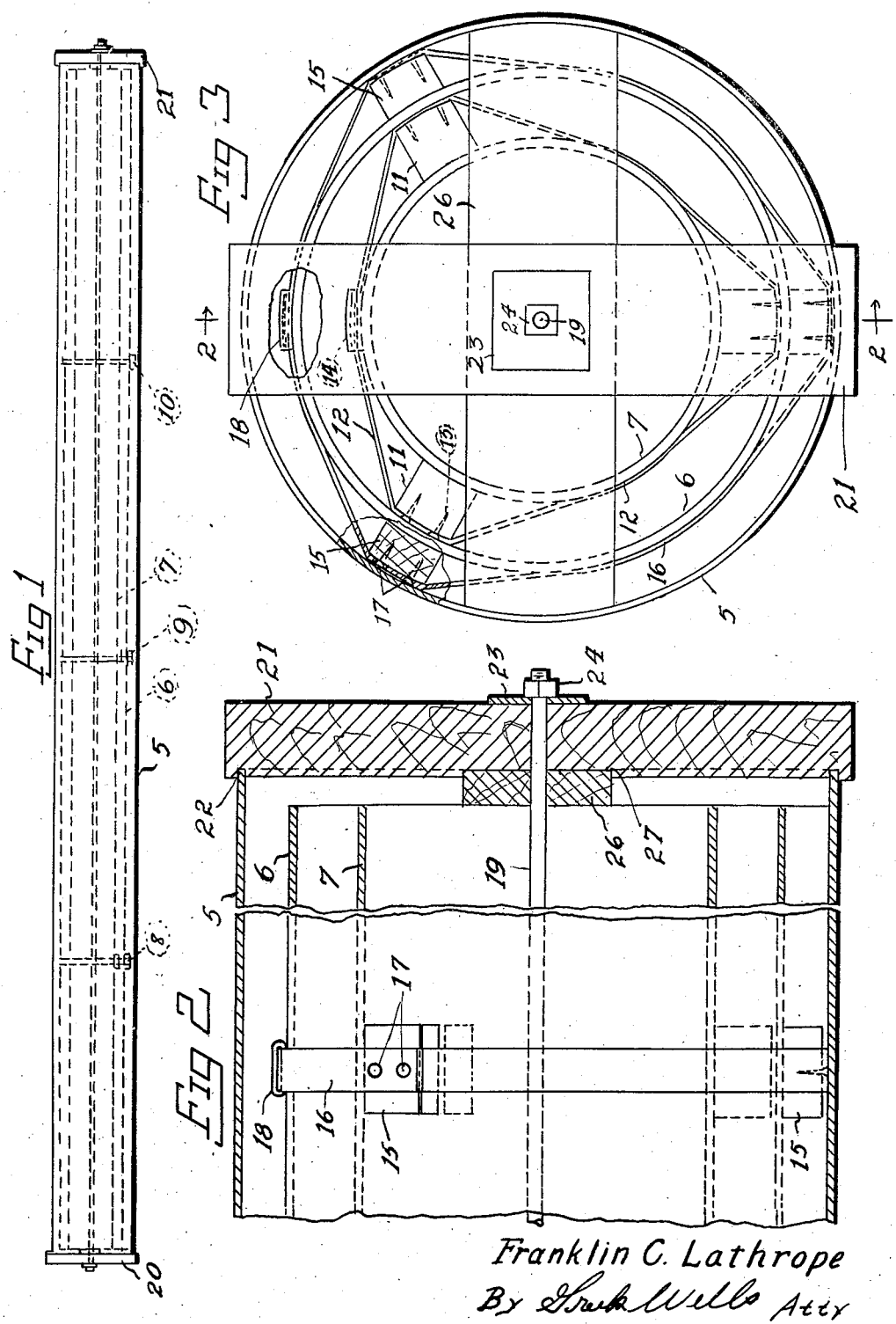
Franklin C. Lathrope Patented July 15, 1947

2,423,986

UNITED STATES PATENT OFFICE 2,423,986

NESTING PIPE

Franklin C. Lathrope, Blue Island, Ill., assignor to Naylor Pipe Company, Chicago, Ill., a corporation of Illinois Application February 6, 1946, Serial No. 645,732

5 Claims. (Cl. 206—65)

1

The present invention relates to means for nesting pipe for shipping purposes. In the shipping of larger sizes of pipe considerable difficulty is encountered because of the great amount of space necessary for the pipe. This is particularly true where the pipe is of the size ranging up to two and three feet in diameter and it is transported on ships. The pipe lengths are substantial and unless the pipes are nested there is a tremendous amount of waste space. Heretofore nesting of the different sizes of pipe to make better use of the space has not been accepted by the steamship companies because of the shifting of the smaller sizes of pipe within the larger sizes.

It is the purpose of my invention to provide means for nesting smaller sizes of pipe within larger sizes which is inexpensive and easy to apply and which adds but very little weight to the nested pipe and which prevents shifting of the smaller pipe within the larger pipe.

The nature and advantages of my invention will appear more fully from the following description and accompanying drawings, wherein a preferred form of the invention is shown. It should be understood however, that the drawings and description are illustrative only, and should not be considered as limiting the invention except insofar as it is limited by the claims.

In the drawings:

Figure 1 is a view in side elevation of a length of pipe nested in accordance with my invention;

Figure 2 is an enlarged fragmentary longitudinal section through a portion of the nested pipe taken substantially on the line 2—2 of Figure 3 but with only the outer pipe in section in the left hand portion of the figure; and Figure 3 is an end view of the nested pipe with certain parts being broken away to illustrate detailed construction.

Referring now to the drawings, Figure 1 shows a plurality of pipes 5, 6 and 7 of different diameters nested one within the other. It is believed to be obvious that, if these pipes were merely placed one within the other, the lower surfaces of the smaller pipes would rest upon the bottom inner surface of the larger pipes. This arrangement is distinctly unstable, particularly in a ship. In order to retain the pipe nested in such fashion as to prevent rolling and shifting of the smaller pipes within the larger, I provide at suitably spaced intervals a series of supporting devices 8, 9 and 10. These supporting devices are illustrated best in Figures 2 and 3. An inner series of wood blocks 11 are circumferentially spaced apart around the outer surface of the smaller

2 pipe 7. The spacing preferably employed is 120 degrees apart for the blocks 11. The blocks are of such thickness as to be slightly less than the difference between the external radius of the pipe 7 and the internal radius of the pipe 6. The three blocks 11 are secured together in proper spaced relation by a metal strap 12 such as the thin steel strap used for tying purposes in packing. The strap is nailed to the blocks by suitable nails 13 and the ends of the strap are connected together by any standard tying device such as that shown at 14 so that the strap is taut over the blocks and the pipe.

Similar blocks 15 are mounted in a like manner on the outer surface of the intermediate pipe 6. These blocks are secured by a strap 16 which is nailed to the blocks 17. The ends of the strap 16 are secured together by a tying device 18.

When the blocks are secured on the smaller pipes these pipes may then be inserted into the larger pipe 5. The number of the units such as 8, 9 and 10 employed for a given length of assembled pipes should be sufficient to prevent undue sagging between units and to give adequate block strength to carry the weight of the pipe.

The assembly of the pipe is completed by running a rod 19 lengthwise through the pipes and mounting it at its opposite ends in two end blocks 20 and 21. The blocks 20 and 21 are circumferentially grooved as shown at 22 to receive the edge of the larger pipe. Plates such as the plates 23 are placed against the outer surfaces of the blocks 20 and 21 and nuts 24 are threaded on the rod 19 to clamp the blocks 20 and 21 in place. The inner pipes 6 and 7 are preferably shortened slightly with respect to the outer pipe 5, and they are held against endwise shifting by two cross bars, one at each end of the inner pipes positioned as shown at 26, which are set into the blocks 20 and 21 slightly as indicated at 27.

From the foregoing description it is believed to be evident that I have provided a simple, inexpensive means for holding pipe of different sizes, in nested relation so that they may be transported with little loss in space.

Having thus described my invention I claim:

1. Means for nesting smaller sizes of pipe within larger sizes of pipe for shipping and the like comprising a plurality of spacing units spaced apart lengthwise of the pipes and interposed between the different sizes of nested pipe, each spacing unit comprising blocks spaced circumferentially about the smaller size pipe, and tying means secured to the blocks and extending around the blocks and smaller size pipe to hold the blocks in spaced relation.

2. Means for nesting smaller sizes of pipe within larger sizes of pipe for shipping and the like comprising a plurality of spacing units spaced apart lengthwise of the pipes and interposed between the different sizes of nested pipe, each spacing unit comprising blocks spaced circumferentially about the smaller size pipe, and tying means secured to the blocks and extending around the blocks and smaller size pipe to hold the blocks in spaced relation and means for engaging the opposite ends of the pipes and holding them against endwise shifting.

3. Means for centering smaller pipes of a nested series of pipes within the largest pipe and preventing shifting of the smaller pipes during shipping, comprising spacing units each comprising a plurality of blocks having their inner and outer surfaces cylindrically curved to match substantially the curvature of the adjacent walls of larger and smaller pipe between which they are placed, and taut straps secured to and extending around the blocks and the smaller pipe.

4. Means for centering smaller pipes of a nested series of pipes within the largest pipe and preventing shifting of the smaller pipes during shipping, comprising spacing units each comprising three blocks spaced apart about 120° around each inner pipe, said blocks having their inner and outer surfaces cylindrically curved to match substantially the curvature of the adjacent walls of larger and smaller pipe between which they are placed, and taut straps secured to and extending around the blocks and the smaller pipe.

5. Means for holding a smaller diameter pipe substantially centered within a larger diameter pipe so as to prevent shifting of the smaller pipe within the larger pipe during shipping, said means comprising at least two spacing units spaced apart lengthwise of the nested pipes, each unit consisting of at least three blocks each of slightly less thickness than the difference between the outer radius of the inner pipe and the inner radius of the outer pipe, the blocks being spaced apart substantially evenly about the inner pipe, and a taut tie member secured individually to the blocks and extending around them and the inner pipe providing securing means to hold the blocks in place and securely clamp them to the outer surface of the inner pipe.

FRANKLIN C. LATHROPE.

REFERENCES CITED

The following references are of record in the file of this patent:

UNITED STATES PATENTS

| Number | Name | Date |
|---|---|---|
| 2,059,390 | Pagel | Nov. 3, 1936 |
| 1,140,633 | Trucano | May 25, 1915 |
| 268,860 | Browell | Dec. 12, 1882 |
| 869,768 | Aylesworth et al. | Oct. 29, 1907 |